(12) United States Patent
Guo et al.

(10) Patent No.: US 12,744,285 B2
(45) Date of Patent: Sep. 22, 2026

(54) MULTILAYER NON-WOVEN MAT FOR LEAD ACID BATTERIES AND APPLICATIONS THEREFOR

(71) Applicant: JOHNS MANVILLE, Denver, CO (US)

(72) Inventors: Zhihua Guo, Ottawa Hills, OH (US); Richard Thomas Hausman, Waterville, OH (US); Souvik Nandi, Highlands Ranch, CO (US)

(73) Assignee: Johns Manville, Denver, CO (US)

(*) Notice: Subject to any disclaimer, the term of this patent is extended or adjusted under 35 U.S.C. 154(b) by 382 days.

(21) Appl. No.: 16/887,796

(22) Filed: May 29, 2020

(65) Prior Publication Data

US 2021/0376304 A1 Dec. 2, 2021

(51) Int. Cl.

*H01M 50/449* (2021.01)
*B32B 5/02* (2006.01)

(Continued)

(52) U.S. Cl.

CPC .......... *H01M 50/449* (2021.01); *B32B 5/022* (2013.01); *B32B 5/08* (2013.01); *B32B 5/26* (2013.01); *B32B 5/266* (2021.05); *B32B 25/042* (2013.01); *B32B 25/10* (2013.01); *B32B 27/06* (2013.01); *B32B 27/12* (2013.01); *B32B 27/32* (2013.01); *D04H 1/413* (2013.01); *D04H 1/4218* (2013.01); *D04H 1/425* (2013.01); *D04H 1/4374* (2013.01); *D04H 1/43838* (2020.05); *D04H 1/593* (2013.01); *D04H 1/642* (2013.01); *H01M 10/06* (2013.01); *H01M 50/411* (2021.01); *H01M 50/44* (2021.01);

(Continued)

(58) Field of Classification Search

None

See application file for complete search history.

(56) References Cited

U.S. PATENT DOCUMENTS 4,216,281 A * 8/1980 O'Rell ................ H01M 50/417 429/252
2006/0242933 A1* 11/2006 Webb .................. B01D 46/521 55/486

(Continued)

FOREIGN PATENT DOCUMENTS

JP 2007227364 A * 9/2007 .......... H01M 2/1653
WO WO-2015095732 A1 * 6/2015 ......... B01D 39/1623

*Primary Examiner* — Marla D McConnell
*Assistant Examiner* — Kevin Worrell
(74) *Attorney, Agent, or Firm* — Robert D. Touslee

(57) ABSTRACT

A multilayer non-woven mat for a lead-acid battery includes a first layer of non-woven web of fibers including coarse fibers having an average fiber diameter from about 6 μm to about 25 μm and a second layer of non-woven web of fibers including microfibers having an average diameter from about 0.5 μm to about 5 μm. The multilayer non-woven mat includes a binder configured to simultaneously bind the coarse fibers in the first layer together, the microfibers in the second layer together, and at least some of the coarse fibers in the first layer to at least some of the microfibers in the second layer together. The first layer is configured to absorb an active material of an electrode of the lead acid battery, and the second layer is configured to block the active material of the electrode from passing through the non-woven glass mat.

15 Claims, 5 Drawing Sheets

(51) Int. Cl.

| | |
|---|---|
| ***B32B 5/08*** | (2006.01) |
| ***B32B 5/26*** | (2006.01) |
| ***B32B 25/04*** | (2006.01) |
| ***B32B 25/10*** | (2006.01) |
| ***B32B 27/06*** | (2006.01) |
| ***B32B 27/12*** | (2006.01) |
| ***B32B 27/32*** | (2006.01) |
| ***D04H 1/413*** | (2012.01) |
| ***D04H 1/4218*** | (2012.01) |
| ***D04H 1/425*** | (2012.01) |
| ***D04H 1/4374*** | (2012.01) |
| ***D04H 1/4382*** | (2012.01) |
| ***D04H 1/593*** | (2012.01) |
| ***D04H 1/64*** | (2012.01) |
| ***H01M 10/06*** | (2006.01) |
| ***H01M 50/411*** | (2021.01) |
| ***H01M 50/44*** | (2021.01) |

(52) U.S. Cl.
CPC ... *B32B 2260/023* (2013.01); *B32B 2260/046* (2013.01); *B32B 2262/04* (2013.01); *B32B 2262/101* (2013.01); *B32B 2262/144* (2021.05); *B32B 2307/724* (2013.01); *B32B 2405/00* (2013.01); *B32B 2457/10* (2013.01)

(56) References Cited

U.S. PATENT DOCUMENTS

| | | | | |
|---|---|---|---|---|
| 2013/0266866 | A1* | 10/2013 | Miyazaki | H01M 50/489 429/223 |
| 2014/0377628 | A1* | 12/2014 | Nandi | H01M 50/403 156/60 |
| 2015/0182885 | A1* | 7/2015 | Thomson | G06V 40/20 210/489 |
| 2017/0151752 | A1* | 6/2017 | Nakamura | B32B 7/12 |
| 2017/0170442 | A1* | 6/2017 | Ashirgade | H01M 50/457 |
| 2018/0047964 | A1* | 2/2018 | Natesh | B32B 27/12 |
| 2019/0148783 | A1* | 5/2019 | Guo | H01M 10/06 429/188 |

* cited by examiner

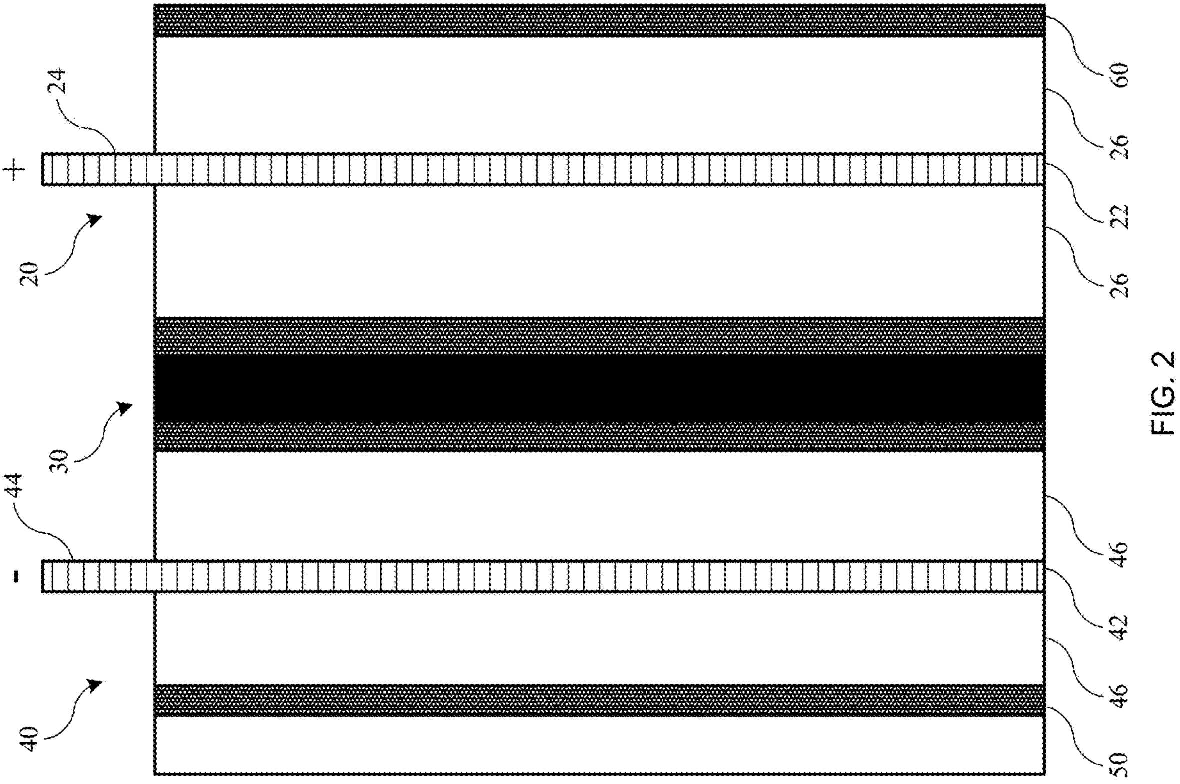
60
26
24
+
22
20
26
30
FIG. 2
44
46
-
42
46
40
50
10

MULTILAYER NON-WOVEN MAT FOR LEAD ACID BATTERIES AND APPLICATIONS THEREFOR

BACKGROUND OF THE INVENTION

The disclosure generally relates to non-woven mats useful as pasting papers or separators that are coupled with or between electrode plate(s) for application in lead acid (LA) batteries.

Electrodes or electrode plates commonly used in lead-acid batteries often include a metallic grid that is used to support lead and/or lead oxide pastes. During charge and discharge cycles, the volume of the lead and/or lead oxide paste typically expands and contracts. Repeated usage and, thus, repeated charge and discharge cycles may have negative effects on the electrode, such as shedding of the active material particles of the lead and/or lead oxide pastes. To reduce those negative effects, the electrodes may be reinforced with pasting media or pasting paper to keep the lead or lead oxide paste intact. Pasting papers may include non-woven mats having the advantage of wicking electrolyte along the electrode plates to benefit battery performance. Non-woven mats are also useful as absorptive separators, for use in sealed recombinant batteries, maintenance-free, electric vehicles, automotive starting batteries, Stop Start, motorcycle, and for stationary application. Non-woven mats for separators and pasting papers should have adequate wickability and tensile strength to withstand the harsh chemical environment within the battery. Fibers chosen for the non-woven mats may have characteristics, such as good wickability for reduced bleed through, which may compete with other characteristics, such as tensile strength for reinforcement. There is a need for pasting papers and separators that provide wickability without sacrificing tensile strength.

BRIEF SUMMARY OF THE INVENTION

The embodiments described herein are directed to non-woven mats for LA batteries. A multilayer mat provides improved function by providing at least one layer having reduced air permeability at least another layer having higher tensile strength, the layers of the multilayer mat used to reinforce an electrode of a lead-acid battery. Such mats may exhibit improved function in limiting bleed through of the electrode's active material, which may enhance the life and performance of the battery.

According to one aspect, a multilayer non-woven mat for a lead-acid battery includes a first layer of non-woven web of fibers including coarse fibers having an average fiber diameter from about 6 μm to about 25 μm and a second layer of non-woven web of fibers including microfibers having an average diameter from about 0.5 μm to about 5 μm. A binder is configured to simultaneously bind the coarse fibers in the first layer together, the microfibers in the second layer together, and at least some of the coarse fibers in the first layer to at least some of the microfibers in the second layer together. The first layer of non-woven web of fibers is configured to absorb an active material of an electrode of the lead acid battery, and the second layer of non-woven web of fibers is configured to block the active material of the electrode from passing through the non-woven glass mat. One of the first layer and the second layer may be configured to be in contact with a plate material of the electrode. The coarse fibers may include 100 wt. % of a total weight of the first layer of non-woven web of fibers. The first layer of non-woven web of fibers may include microfibers having an average diameter from about 0.5 μm to about 5 μm. A weight ratio of the coarse fibers to the microfibers in the first layer may range between about 70:30 and 99:1. The microfibers may include 100 wt. % of a total weight of the second layer of non-woven web of fibers. The second layer of non-woven web of fibers may include coarse fibers having an average diameter from about 6 μm to about 25 μm. A weight ratio of the microfibers to the coarse fibers in the second layer may range between about 30:70 and 99:1, or may range between 10:90 and 90:10. Microfibers may include at least one of microfiber glass, synthetic fibers, natural fibers, organic fibers, inorganic fibers, polymer fibers, and cellulose fibers. Coarse fibers may include at least one of glass, synthetic fibers, natural fibers, organic fibers, inorganic fibers, polymer fibers, and cellulose fibers. Coarse fibers may be glass. A thickness of the non-woven glass mat may range between about 0.1 mm and 3.0 mm, or between about 0.15 mm and 1.5 mm. The first layer may be between 5 and 95 percent of a thickness of the multilayer non-woven mat, and the second layer may be between 95 and 5 percent of the thickness of the multilayer non-woven mat. A ratio of a weight of the first layer to a weight of the second layer may range between 0.05 and 20. The binder may be an organic binder, such as an acrylic based emulsion. The organic binder may include between about 0.5 wt. % and 60 wt. % of a total weight of the multilayer non-woven mat, or between about 5.0 wt. % and 50 wt. % of a total weight of the multilayer non-woven mat. At least one of the first layer and the second layer may include a filler material including at least one of silica and carbon. The filler material may include between about 0.1 wt. % and 30 wt. % of a total weight of the non-woven glass mat. At least one of the first layer and the second layer may include functional fibers, such as carbon fibers. The first layer of non-woven web of fibers may include coarse fibers having an average fiber diameter from about 6 μm to about 25 μm. The second layer of non-woven web of fibers may include microfibers having an average diameter from about 0.5 μm to about 5 μm.

According to another aspect, a pasting paper for a lead-acid battery includes an active material layer, a multilayer non-woven mat coupled to the active material layer at a first exterior surface of the multilayer non-woven mat. The multilayer non-woven mat includes a first layer of non-woven web of fibers defining the first exterior surface of the multilayer non-woven mat, a second layer of non-woven web of fibers adjacent the first layer and defining a second exterior surface of the multilayer non-woven mat; and a binder configured to simultaneously bind the fibers in the first layer together, the fibers in the second layer together, and at least some of the fibers in the first layer to at least some of the fibers in the second layer. One of the first layer or the second layer includes coarse fibers have an average fiber diameter from about 6 μm to about 25 μm, and the other of the first layer or the second layer includes microfibers having an average diameter from about 0.5 μm to about 5 μm. The same active material forming the active material layer penetrates through the first exterior surface of the non-woven glass mat and is disposed in the first layer and the second layer with minimal penetration, or without any penetration, of the active material through the second exterior surface of the non-woven glass mat. The layer may include microfibers being in contact with a plate material for a positive or negative electrode in the lead acid battery. The microfibers may include at least one of microfiber glass, synthetic fibers, natural fibers, organic fibers, inorganic fibers, polymer fibers, and cellulose fibers. The coarse fibers may include at least one of glass, synthetic fibers, natural fibers, organic fibers, inorganic fibers, polymer fibers, and cellulose fibers.

According to another aspect, a separator for a lead acid battery includes a polyethylene or rubber film, and a multilayer non-woven mat coupled to the polyethylene or rubber film at a first exterior surface of the multilayer non-woven mat. The multilayer non-woven mat includes a first layer of non-woven web of fibers defining the first exterior surface of the multilayer non-woven mat, and a second layer of non-woven web of fibers adjacent the first layer and defining a second exterior surface of the multilayer non-woven mat. A binder is configured to simultaneously bind the fibers in the first layer together, the fibers in the second layer together, and at least some of the fibers in the first layer to at least some of the fibers in the second layer. One of the first layer or the second layer includes coarse fibers have an average fiber diameter from about 6 μm to about 25 μm, and the other of the first layer or the second layer includes microfibers having an average diameter from about 0.5 μm to about 5 μm. The multilayer non-woven mat may have a thickness from about 0.1 mm to about 3.0 mm, or may have a thickness from about 0.2 mm to about 1.0 mm. The layer including coarse fibers may be in contact with the polyethylene or rubber film. The multilayer non-woven mat may be a separator for an Absorptive Glass Mat (AGM) lead acid battery. The microfibers may include at least one of microfiber glass, synthetic fibers, natural fibers, organic fibers, inorganic fibers, polymer fibers, and cellulose fibers. The coarse fibers may include at least one of glass, synthetic fibers, natural fibers, organic fibers, inorganic fibers, polymer fibers, and cellulose fibers.

According to another aspect, a method of forming a multi-layer fiber mat includes pouring or discharging a first fluid mixture onto a porous belt or surface, draining or removing the first fluid from the first fluid mixture as the first fluid mixture is poured or discharged onto the porous belt or surface in order to form a layer of the first group of fibers atop the porous belt or surface, pouring or discharging a second fluid mixture onto the porous belt or surface atop the layer of the first group of fibers as the first fluid is drained or removed from the first fluid mixture, draining or removing the second fluid from the second fluid mixture as the second fluid mixture is poured or discharged onto the porous belt or surface in order to form a layer of the second group of fibers atop the porous belt or surface and atop the layer of the first group of fibers. The method includes applying a binder to the layer of the first group of fibers and the layer of the second group of fibers in order to simultaneously bind the layer of the first group of fibers together, the layer of the second group of fibers together, and the first group of fibers and the second group of fibers together. The method includes drying the mat having the first and second layers to form a multilayer non-woven mat and applying the multilayer non-woven mat to one of a positive electrode, a negative electrode, or a polyethylene or rubber film for use in a lead acid battery. The first fluid mixture includes a first fluid and a first group of fibers that are homogenously mixed or dispersed within the first fluid. The second fluid mixture includes a second fluid and a second group of fibers that are homogenously mixed or dispersed within the second fluid. The layer of the second group of fibers and the layer of the first group of fibers are simultaneously formed. The second fluid mixture is poured or discharged onto the porous belt or surface within 30 inches of where the first fluid mixture is poured or discharged onto the porous belt or surface. The binder may be the only binder that is applied to the first group of fibers and the second group of fibers. The multilayer non-woven mat may not include a binder concentration at an interface between the layer of the first group of fibers and the layer of the second group of fibers. The binder may be homogenously or uniformly dispersed within the multilayer non-woven mat. The first group of fibers may include coarse fibers having an average fiber diameter of between 6 μm and 25 μm. The second group of fibers may include microfibers having an average fiber diameter of between 0.5 μm and 5 μm. The first group of fibers may include coarse fibers having an average fiber diameter of between 8 μm and 25 μm.

BRIEF DESCRIPTION OF THE DRAWINGS

Various features, aspects, and advantages of the present invention will be better understood when the following detailed description is read with reference to the accompanying figures in which like characters represent like parts throughout the figures, wherein:

FIG. 2 is an assembled cross section view of the battery cell assembly of FIG. 1;

DETAILED DESCRIPTION OF THE INVENTION

Figure 1:
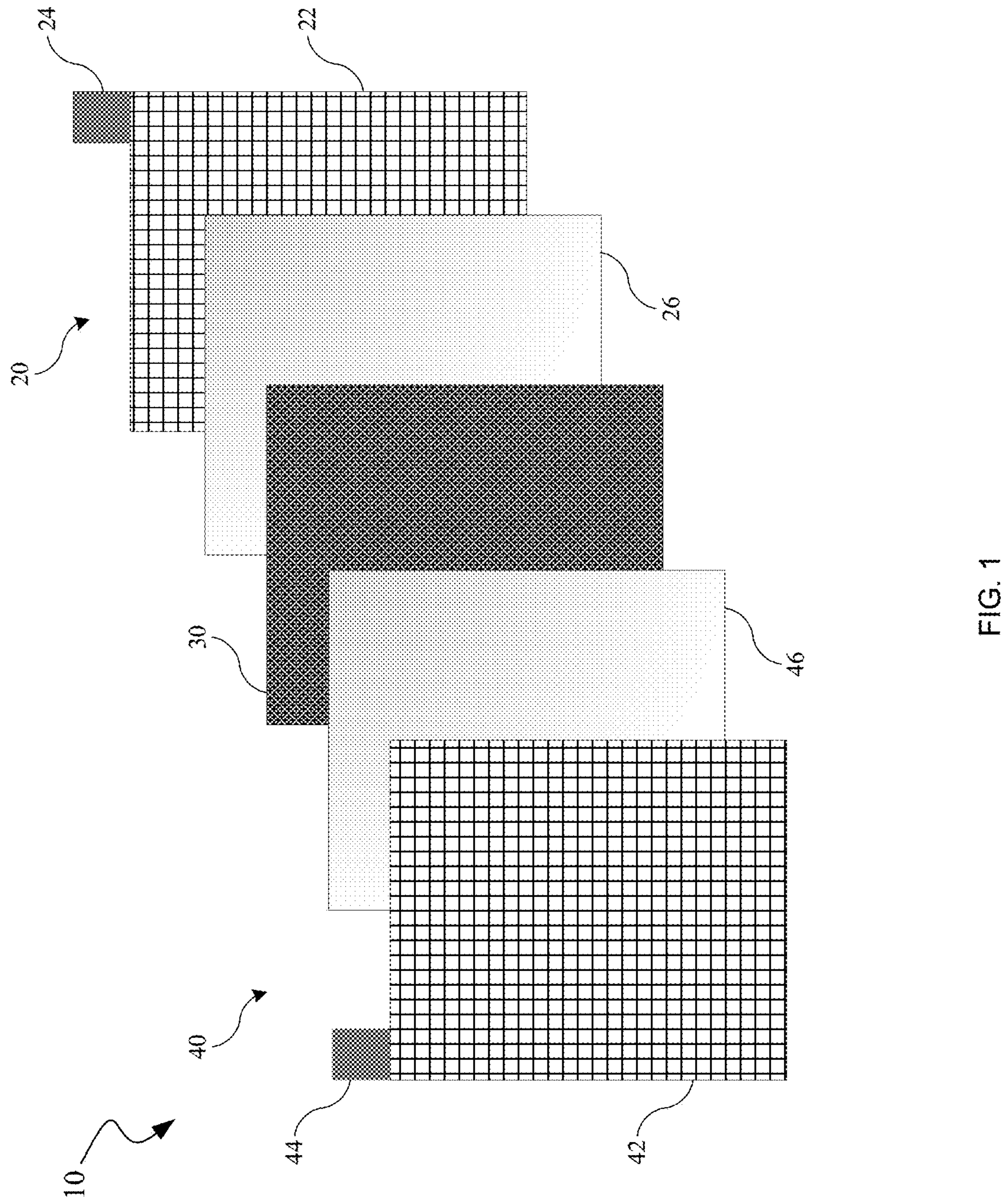
FIG. 1 is an exploded perspective view of a battery cell assembly.

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Lead-acid (LA) batteries are inexpensive and reliable and are widely used as an electrical power source for starting motor vehicles or golf carts and other electric vehicles. The pasting papers of the disclosure are applicable to Absorptive Glass Mat (AGM) and flooded batteries including Enhanced Flooded lead acid batteries (EFB), as well as other battery type applications using non-woven mats. For example, the use of pasting paper for AGM LA batteries is known as a means to improve the manufacturing process for applying lead oxide or lead paste to the grid of a LA battery plate. High wicking strength is required for the pasting paper and conventional pasting papers for AGM batteries typically exhibit low porosity and air permeability. In some instances, a similar but thinner product referred to as an AGM separator is used in place of conventional pasting paper. Separators may be needlessly over engineered for the wicking property and lack the desired strength characteristics, and they are also expensive to manufacture. The high concentration of microfibers, which are generally more expensive than coarse fibers, may increase material cost. Conventional pasting papers for EFB are not as low in porosity and/or air permeability due to the increase in electrical resistance for providing charge acceptance and greater cyclic durability operating in a reduced state of charge (typical of Stop Start applications). Conventional methods of producing non-woven fiber mats for pasting papers or separators may result in a product that is structurally weak and/or suffers from other issues. For example, conventional methods typically produce mats or paper for AGM batteries that are composed essentially of 100% glass microfibers and that are thin, very closed-up, soft, and are characteristically weak while exhibiting good wicking properties. In addition to providing wickability, in many applications a pasting paper is used to support the active material (e.g., lead and/or lead oxide) to limit or prevent shedding of the active material from the electrode. The structural support and/or wickability that the non-woven fiber mat provides may be enhanced by reducing the porosity and/or air permeability. The porosity and/or air permeability may be decreased by using filler materials and/or increasing the amount of microfibers that are used.

Non-woven glass mats are typically made by conventional wet laid processes. In these processes a slurry of glass fiber is made by adding glass fiber to a typical white water (or called "process water") in a pulper to disperse the fiber in the white water forming a slurry having a fiber concentration of about 0.2-1.0 weight %, metering the slurry into a flow of white water and depositing this mixture on to a moving screen forming wire to dewater and form a wet non-woven fibrous mat, on machines like a Hydroformer™ manufactured by Voilh-Sulzer of Appleton, Wis., or a Deltaformer™ manufactured by North County Engineers of Glenns Falls, N.Y. This wet non-woven mat of glass fiber is then transferred to a second moving screen and run through a binder application saturating station where an aqueous binder mixture, such as an acrylic binder is applied to the mat. This is followed by sucking off the excess binder and drying the unbonded, wet mat and curing the resin binder which bonds the fibers together in the mat. Preferably, the binder is applied using a curtain coater or a dip and squeeze applicator, but other methods of application such as spraying will also work. In the drying and curing oven, the mat is subjected to temperatures of 250-450 or 500° F. for periods usually not exceeding 1-2 minutes and as little as a few seconds.

An AGM separator or a traditional pasting paper for AGM batteries, made from essentially microfiber glass, may be manufactured on specialty paper machines using acidified water to help disperse the microfibers. Normally, sulfuric acid is used but other acids, such as phosphoric, can also be used. The typical pH used to disperse the fiber is in the 2.0-3.0 range. Due to this acidic nature, stainless steel is the material of choice for all piping and other major equipment. This increases the capital cost of the equipment. The wet-laid operation for a typical non-woven glass is simpler, safer, and less expensive.

The separator configuration of polyethylene membrane (or rubber separator) with a supporting glass mat does not work well when the battery is under high temperatures for a long period of time. The battery tends to lose water (partial "dry out"), which leads to at least two issues. First, the upper parts of the electrode plates are exposed to air. The negative plate can be oxidized. In addition, due to less volume of the electrodes in the electrolyte, the usage of the active materials can be reduced, therefore lowering capacity and performance of the battery. Second, electrolyte sulfuric acid becomes more concentrated and the concentration is not optimal. This higher concentration may reduce the battery performances and may be more caustic to all the battery parts, include plates, separator, and container. If the support mat has good wicking property for the electrolyte, then when the volume of the electrolyte reduces due to exposure of high temperatures for a long period of time, the mat can still hold some electrolyte and cover the electrodes. In this manner, the oxidization of the negative plate can be minimized.

By using a conventional wet-laid mat machine, there is usually a limitation on how much (%) microfiber can be used in the homogeneous fiber mixture, for example about 30 wt. %. When the microfiber percentage is too high (for the benefit of higher wicking behavior), the mat can be too closed up, which can lead to challenges in drying and curing of the mat and also may generate excessive smoke during the process. As such, glass mats made using conventional wet-laid mat process cannot typically meet the specification/requirement of the pasting material used in an AGM battery. On the other hand, mats made using conventional wet-laid processes are much stronger than the currently used pasting mat in an AGM battery. Because of the excellent strength of the mat, the mat has the potential of significantly increasing the line speed of the pasting and production efficiency. However, due to its inferior wicking property, the mat cannot be used for this application.

In some conventional mats, a dual layer construction may be employed, e.g., coarse fibers forming a layer and microfibers forming another layer adjacent the layer of coarse fibers with the higher density microfiber layer, having bored-openings for electrolyte diffusion, in contact with the surface of the positive plate. This dual layer construction may be used due to the difficulty in homogeneously dispersing coarse glass fibers and micro-glass fibers during formation of the non-woven fiber mat. For example, producing a non-woven glass mat having coarse glass fibers in a wet laid process requires a set of parameters that are vastly different than the parameters that are used to produce a non-woven glass mat having microfibers. Thus, the two layers are typically formed separately and binder and pressure are used to bring the layers together.

In contrast to these conventional mats, the manufacturing process and products described herein have a multilayer construction with layers having different fiber compositions. The mats are wet-laid together to produce multilayer non-woven mats having a layer providing at least one functionality such as wickability and another layer providing another functionality such as tensile strength. The layers combine to provide a product having both functionalities. The terms "wickability" and "wettability" may be interchangeable as described herein and thus, it should be realized that the term "wettability" may replace the term "wickability", and vice versa, in the description and/or claims.

As used herein the term "pasting paper" refers to a material that is placed adjacent an electrode of a lead acid battery, typically during the manufacture of the electrode such as during the application of the active material to a metal grid. The pasting paper may remain in place adjacent the electrode during use of the lead acid battery to limit or prevent shedding of the active material from the electrode. Although the term "paper" is used in describing the material, in many of the embodiments described herein the pasting paper material is a non-woven fiber mat that is typically made of a combination of fibers. In some embodiments the non-woven fiber mat may consist entirely of glass fibers, although in other embodiments various other fiber types may also be used including polymeric fibers, cellulose fibers, and the like. The term pasting paper may be used interchangeably herein with reinforcement mat, non-woven fiber reinforcement mat, and/or non-woven fiber mat and it should be realized that these terms may refer to the same material. Other filler materials may also be added to the non-woven fiber mat for various reasons, some of which are described in greater detail herein. The term "coarse fibers" in this application is understood to mean fibers having an average diameter between about 6 μm and 25 μm, and more commonly between about 8 μm and 25 μm, and an average length between about ¼ inch and 2 inches. The term "microfibers" is understood to mean fibers having an average diameter between about 0.5 μm and 5 μm, and more commonly between about 0.5 μm and 4 μm, with varying length. The coarse and microfibers may be fibers made from E glass, C glass, T glass, sodium borosilicate glass, A & S glasses, Basalt, mineral wool, slag fiber, cellulose, and mixtures thereof.

The embodiments below disclose non-woven mats that may be used as pasting paper, separators, and the like for use in LA batteries. The non-woven mats discussed below include multiple layers of fibers made in a single step or process. In other words, the layers of the non-woven mats discussed below are not separately formed and then combined in a later stage or process (i.e., separately made and then bonded, laminated, or otherwise joined together). Rather, the layers are formed simultaneously, which results in a non-woven mat that functions as a single layer in terms of structure and integrity despite having different fiber compositions and layer densities. Accordingly, the non-woven mats discussed may be produced at lower cost and in less time.

One or more of the layers may include a blend of differently sized fibers. The differently sized fibers form layers of different porosities and tensile strength within the non-woven mats. For example, one or more layers may include both coarse fibers and microfibers. Furthermore, some embodiments may include one or more layers of differently sized coarse fibers, differently sized microfibers, or a combination thereof. The coarse or larger diameter fibers may range in size between about 6 μm and about 25 μm, and small diameter fibers or microfibers may range in size between about 0.5 μm and 5 μm. In a more specific embodiment, the coarse or larger diameter fibers may range in size between about 8 μm and about 25 μm, between about 8 μm and about 16 μm, and more commonly between about 11 μm and 16 μm. The small diameter fibers or microfibers may range in size between about 0.5 μm and 5 μm, between about 0.5 μm and 4 μm, and more commonly between 0.7 μm and 3 μm. In a specific embodiment, the larger diameter fibers may be about 13 μm diameter fibers and the microfibers may be about 3 μm in diameter. The non-woven mat includes at least one binder that bonds the large diameter fibers and microfibers together to form the fiber mat. The binder may be water repellant and/or include a water repellant additive such as a stearylated melamine water repellant. Typically, the binder may be an organic binder. The binder may be between about 0.5 wt. % and 60 wt. % of a total weight of the multilayer non-woven mat, and more commonly between about 5.0 wt. % and 50 wt. % of a total weight of the multilayer non-woven mat.

In some embodiments, the larger diameter fibers may be about 90% of the total fibers in the multilayer non-woven mat and the microfibers may be about 10%. In some embodiments, the larger diameter fibers may be about 10% of the total fibers in the multilayer non-woven mat and the microfibers may be about 90%. For example, percentages of larger fibers to microfibers based upon the total fibers in the multilayer non-woven mat described herein may range from about 90% coarse:10% microfiber to about 10% coarse:90% microfiber, or may be any amount in between such as about 80% coarse:20% microfiber, about 70% coarse:30% microfiber, about 60% coarse:40% microfiber, as about 50% coarse:50% microfiber, about 40% coarse:60% microfiber, about 30% coarse:70% microfiber, or about 20% coarse:80% microfiber. All or substantially all of the microfibers may be in a single layer of the multilayer non-woven mat. With a layer using mainly microfibers, less microfibers are needed overall in the multilayer construction to achieve a desired porosity. In contrast to conventional mats having a homogeneous mixture of coarse and microfibers, a multilayer non-woven mat construction may potentially reduce the overall usage of microfibers (and thereby lowering cost) to achieve similar porosity.

As mentioned above, at least one layer of the multilayer non-woven mat may include 100% or substantially 100% of the microfibers based upon the total microfibers in the multilayer non-woven mat. In other embodiments, the at least one layer of the multilayer non-woven mat includes about 70%, about 75%, about 80%, about 85%, about 90%, about 95%, about 96%, about 97%, about 98%, about 99%, or about 100% of the microfibers based upon the total microfibers in the multilayer non-woven mat to provide the desired wickability. All or substantially all of the microfibers may be in a single layer of the multilayer non-woven mat. With a layer using mainly microfibers, less microfibers are needed overall in the multilayer construction to achieve a desired porosity. In contrast to conventional mats having a homogeneous mixture of coarse and microfibers, a multilayer non-woven mat construction may potentially reduce the overall usage of microfibers (and thereby lowering cost) to achieve similar porosity. At least one layer of the multilayer non-woven mat may include 100% or substantially 100% of the coarse fibers based upon the total coarse in the multilayer non-woven mat. In other embodiments, the at least one layer of the multilayer non-woven mat includes about 70%, about 75%, about 80%, about 85%, about 90%, about 95%, about 96%, about 97%, about 98%, about 99%, or about 100% of the coarse fibers based upon the total coarse fibers in the multilayer non-woven mat to provide the desired strength.

By including layers with different porosities and tensile properties, the non-woven fiber mat provides the desired wickability and strength, respectively. Having more microfibers in at least one of the layers of the multilayer non-woven mat yields a higher ability to wick, or stated differently, provides a more hydrophilic layer. The layer having the lower porosity (e.g., layer more rich in microfibers) may be positioned in contact with the plate material for higher wickability and less bleed-through, which also minimizes lead dust in the work environment. The layer having the higher porosity and higher tensile strength (e.g., layer more rich in coarse fibers) is in contact with the lower porosity layer rather than in contact with the plate material. Alternatively, the higher porosity layer having a higher coarse fiber content may be positioned against the paste for better bonding and adhesion. The higher porosity layer may allow the paste to penetrate through the layer to a greater degree due to the layer being more porous, which enhances adhesive of the layer to the paste and plate. The increased adhesion to the paste may be preferred. Thus, the non-woven fiber mat may form a functional pasting paper or separator that exhibits integrity for long wear and performance. The non-woven mats described herein are able to prevent bleed through of the electrolyte material without sacrificing strength. This is not attainable in conventional single layer homogenous mat constructions due to wickability and strength being competing properties. With a conventional homogenous mat, either bonding characteristics are sacrificed for better bleed through performance or vice versa. The multilayer non-woven mat described herein includes a layer rich in microfibers to provide desired wickability and bleed through characteristics, and a layer rich in coarse fibers to provide strength, i.e., structural reinforcement for the layer rich in microfibers.

In some embodiments, the multilayer non-woven mat described herein may be used as a support mat or a retainer mat with a polyethylene or rubber separator to provide support and other potential benefits, such as reducing acid stratification of the multilayer non-woven mat having a microfiber-rich layer. Besides stratification, other properties influenced by the separator include compression, acid availability, wicking, battery assembly cost, and battery life. Conventional AGM separators may be 100% microfiber glass making them expensive. Separators, e.g., absorptive separators, may be designed specifically for sealed recombinant batteries, maintenance-free, electric vehicles, automotive starting batteries, motorcycle and for stationary application. In a specific example, a valve regulated lead acid (VRLA) battery may have an AGM separator, which plays a critical role in battery performance compared to a traditional separator in a flooded lead acid system. Separators are used between the battery's plates to prevent short circuits, and must meet a number of requirements, such as permeability, porosity, mechanical strength, electrical resistance, and ionic conductivity. The AGM separator must provide force to the active material, which minimizes premature capacity loss. The separator should also have suitable strength characteristics for high-speed assembly, be able to hold all the required sulfuric acid, and be able to regulate oxygen transfer from the positive plate to the negative plate. The force that the separator applies to the positive and negative plates enables a VRLA battery to exhibit increased vibration resistance for off-road or heavy-duty equipment.

FIGS. 1 and 2, respectively, show a perspective exploded view of a lead-acid battery cell 10 and a cross-section assembled view of the lead-acid battery cell 10. The lead-acid battery cell 10 may represent a cell used in either flooded lead-acid batteries, including EFB, or AGM batteries. Each cell 10 may provide an electromotive force (emf) of about 2.1 volts and a lead-acid battery may include three such cells 10 connected in series to provide an emf of about 6.3 volts or may include six such cells 10 connected in series to provide an emf of about 12.6 volts, and the like. Cell 10 may include a positive plate or electrode 20 and a negative plate or electrode 40 separated by battery separator 30 so as to electrically insulate the electrodes 20 and 40. Positive electrode 20 may include a grid or conductor 22 of lead alloy material. A positive active material 26, such as lead dioxide, is typically coated or pasted on grid 22. Grid 22 is also typically electrically coupled with a positive terminal 24. Grid 22 provides structural support for the positive active material 26 along with electrical conductivity to terminal 24.

Likewise, negative electrode 40 includes a grid or conductor 42 of lead alloy material that is coated or pasted with a negative active material 46, such as lead. Grid 42 is electrically coupled with a negative terminal 44. Like grid 22, grid 42 structurally supports the negative active material 46 and provides electrical conductance to terminal 44. In flooded type lead-acid batteries, positive electrode 20 and negative electrode 40 may be immersed in an electrolyte (not shown) that may include a sulfuric acid and water solution. In AGM type lead-acid batteries, the electrolyte may be absorbed and maintained within battery separator 30. Battery separator 30 may be positioned between positive electrode 20 and negative electrode 40 to physically separate and electrically insulate the two electrodes while enabling ionic transport between the electrodes, thus completing a circuit and allowing an electronic current to flow between positive terminal 24 and negative terminal 44. Separator 30 may include a microporous membrane (i.e., the solid black component), which is often a polymeric film having negligible conductance. The polymeric film may include micro-sized voids that allow ionic transport (i.e., transport of ionic charge carriers) across separator 30. In some examples, the microporous membrane or polymeric film may have a thickness of 50 micrometers or less, including 25 micrometers or less, may have a porosity of about 50% or 40% or less, and may have an average pore size of 5 μm or less, including 1 μm or less. The polymeric film may include various types of polymers including polyolefins, polyvinylidene fluoride, polytetrafluoroethylene, polyamide, polyvinyl alcohol, polyester, polyvinyl chloride, nylon, polyethylene terephthalate, and the like. Separator 30 may also include one or more fiber mats (e.g., separator support mat) that are positioned adjacent one or both sides of the microporous membrane/polymeric film to reinforce the microporous membrane and/or provide puncture resistance. In AGM applications, the polymeric film may not be included. Instead, the non-woven fiber mat separator 30 may be relatively thick and may be used to both absorb the electrolyte and electrically isolate the positive and negative electrodes. Separator 30 may include at least one multilayer non-woven mat as described herein.

As shown in FIG. 2, positioned near a surface of negative electrode 40 may be a multilayer non-woven mat 50. Multilayer non-woven mat 50 may be disposed partially or fully over the surface of negative electrode 40 so as to partially or fully cover the surface. Various configurations may employ the multilayer non-woven mat. Mat 50 may be disposed on both surfaces of the negative electrode 40, or may fully envelope or surround the electrode. Although multilayer non-woven mat 50 is shown on the outer surface of the electrode 40, in some examples, multilayer non-woven mat 50 may be positioned on the inner surface of the electrode 40 (i.e., adjacent separator 30). Multilayer non-woven mat 50 may reinforce the negative electrode 40 and may provide an additional supporting component for the negative active material 46. The additional support provided by multilayer non-woven mat 50 may help reduce the negative effects of shedding of the negative active material particles as the active material layer softens from repeated charge and discharge cycles. This may reduce the degradation commonly experienced by repeated usage of lead-acid batteries. As described in greater detail below, the structural support provided by multilayer non-woven mat 50 is enhanced by having a layer providing at least one functionality such as wickability and another layer providing another functionality such as tensile strength.

Multilayer non-woven mat 50 may often be impregnated or saturated with the negative active material 46 so that the multilayer non-woven mat 50 is partially or fully disposed within the active material 46 layer. Impregnation or saturation of the active material within the multilayer non-woven mat means that the active material penetrates at least partially into the mat. For example, multilayer non-woven mat 50 may be fully impregnated with the negative active material 46 so that multilayer non-woven mat 50 is fully buried within the negative active material 46 (i.e., fully buried within the lead paste). Fully burying multilayer non-woven mat 50 within the negative active material 46 means that the mat is entirely disposed within the negative active material 46. For example, multilayer non-woven mat 50 may be disposed within the negative active material 46 up to about a depth of about 20 mils (i.e., 0.020 inches or 0.508 mm) from an outer surface of the electrode 40. In other examples, the multilayer non-woven mat 50 may rest atop the negative active material 46 so that the mat is impregnated with very little active material. Often the multilayer non-woven mat 50 may be impregnated with the negative active material 46 so that the outer surface of the mat forms or is substantially adjacent the outer surface of the electrode 40 (see multilayer non-woven mat 60). In other words, the active material may fully penetrate through the multilayer non-woven mat 50 so that the outer surface of the electrode 40 is a blend or mesh of active material and multilayer non-woven mat fibers.

As shown in FIG. 2, positioned near a surface of positive electrode 20 may be a multilayer non-woven mat 60. Multilayer non-woven mat 60 may be disposed partially or fully over the surface of positive electrode 20 so as to partially or fully cover the surface. Various configurations may employ the multilayer non-woven mat similarly as described above for multilayer non-woven mat 50. Multilayer non-woven mat 60 may often be impregnated or saturated with the positive active material 26 so that the multilayer non-woven mat 60 is partially or fully disposed within the active material 26 layer. Impregnation or saturation of the active material within the multilayer non-woven mat means that the active material penetrates at least partially into the mat. For example, multilayer non-woven mat 60 may be fully impregnated with the positive active material 26 so that multilayer non-woven mat 60 is fully buried within the positive active material 26 (i.e., fully buried within the lead paste). Fully burying multilayer non-woven mat 60 within the positive active material 26 means that the mat is entirely disposed within the positive active material 26. For example, multilayer non-woven mat 60 may be disposed within the positive active material 26 (similarly as described above for multilayer non-woven mat 50) or the multilayer non-woven mat 60 may rest atop the positive active material 26 so that the mat is impregnated with very little active material. Often the multilayer non-woven mat 60 may be impregnated with the positive active material 26 so that the outer surface of the mat forms or is substantially adjacent the outer surface of the electrode 20 as shown. In other words, the active material may fully penetrate through the multilayer non-woven mat 60 so that the outer surface of the electrode 20 is a blend or mesh of active material and multilayer non-woven mat fibers.

The thickness of the multilayer non-woven mat 50 and/or 60 may be a function of mat weight, binder content (as measured by Loss on Ignition [LOI]), and fiber diameter. The type of binder used and the length of the fibers may be weaker factors in determining the glass mat thickness. Higher binder content, however, may generally reduce the glass mat thickness, although excessive binder use may pose various processing challenges during mat production and thereafter. A lower mat weight may also reduce the mat thickness. The mat weight, however, may also be limited because the mat needs to provide enough tensile strength during winding and downstream processes.

Figure 3:
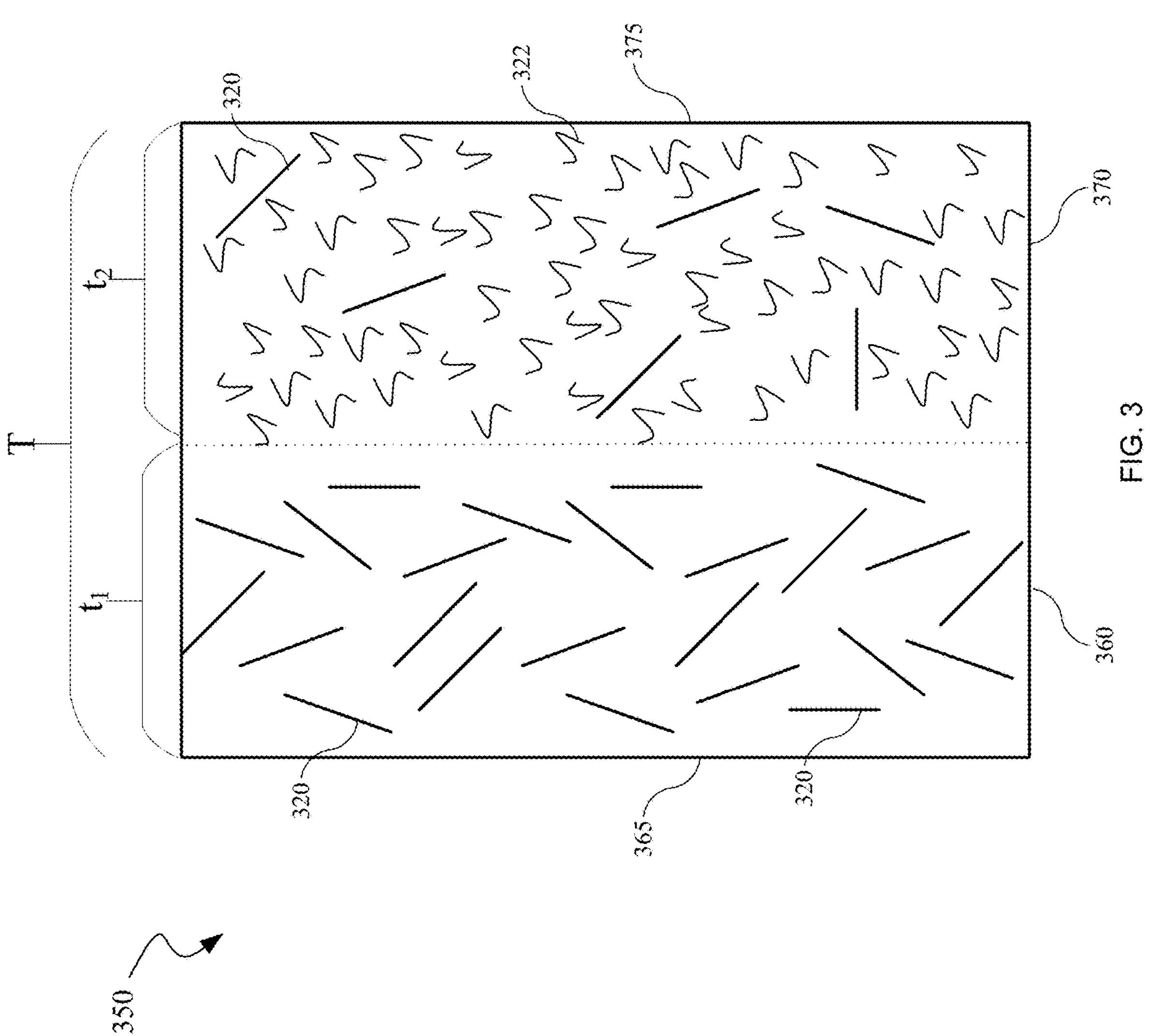
FIG. 3 is a cross section view of a configuration of a non-woven mat.

In some embodiments, multilayer non-woven mats as described above (e.g., 30, 50, and/or 60) may have at least two layers as illustrated in multilayer non-woven mat 350 of FIG. 3. Multilayer non-woven mat 350 includes a first layer 360 having a first fiber blend composition and a second layer 370 having a second fiber blend composition, where the first and second fiber blend compositions are different. At least one of the first and second fiber blend compositions includes at least two different pluralities of fibers, the at least two different pluralities of fibers having different characteristics such as fiber length, fiber diameter, fiber material, or combinations thereof. These layers are formed in a single process, or stated differently, the layers are not produced in separate processes and then later combined. The at least two layers are integrally formed via wet-laid processing using a double headbox configuration (described below with regards to FIG. 4) prior to application of a binder that forms a continuous matrix through the multilayer non-woven mat total thickness T.

In one embodiment, the first layer 360 may be formed entirely of coarse fibers 320 having an average fiber diameter of between 6 μm and 25 μm, between 8 μm and 25 μm, between 8 μm and 16 μm, and more commonly between 11 μm and 16 μm. In another embodiment, the first layer 360 may include both coarse fibers 320 and microfibers 322, which are typically homogenously dispersed or distributed throughout the first layer 360. For example, the percentage by weight of the coarse fibers 320 in the first layer 360 may vary between 75 and 99 percent, while the percentage by weight of the microfibers 322 may vary between 1 and 25 percent. In another embodiment, the first layer 360 may be formed from a combination of differently sized coarse fibers 320, which are typically homogenously dispersed or distributed throughout the first layer 360. For example, the first layer 360 may be formed from a first type of coarse fibers 320 having an average diameter between 8 μm and 11 μm, which is then mixed with a second type of coarse fibers 320 having a diameter between 12 μm and 25 μm. In another embodiment, the first layer of non-woven web of fibers including coarse fibers may further include microfibers having an average diameter from about 0.5 μm to about 5 μm, and more commonly between 0.5 μm and 4 μm, and wherein a weight ratio of the coarse fibers to the microfibers in the first layer ranges between about 70:30 and 99:1. The first layer may include at least one of glass, microfiber glass, synthetic fibers, natural fibers, organic fibers, inorganic fibers, polymer fibers, cellulose fibers, and combinations thereof. The first layer of non-woven web of fibers, wherein the first layer comprises coarse fibers having an average fiber diameter from about 6 μm to about 25 μm, or between 8 μm and 25 μm, has a first air permeability. The air permeability is believed to be proportional to and/or an indicator of paste bleed through.

In another embodiment, the second layer 370 may be formed out of a combination of coarse fibers 320 and microfibers 322. When a combination of coarse fibers and microfibers are employed, the coarse fibers and microfibers are typically homogenously dispersed or distributed throughout the second layer 370. In an embodiment that includes both coarse fibers 320 and microfibers 322, the percentage of weight of the coarse fibers 320 and the microfibers 322 may vary. For example, the percentage by weight of the coarse fibers 320 in the second layer 370 may vary between 60 and 99 percent, while the percentage by weight of the microfibers 322 may vary between 1 and 40 percent. In another embodiment, the percentage by weight of the coarse fibers 320 in the second layer 370 may vary between 1 and 20 percent, while the percentage by weight of the microfibers 322 may vary between 80 and 99 percent, which would result in a mat that is substantially less porous. The coarse fibers 320 in the second layer 370 provide strength and integrity to the layer. In another embodiment, the second layer of non-woven web of fibers including microfibers further includes coarse fibers having an average diameter from about 6 μm to about 25 μm, and wherein a weight ratio of the microfibers to the coarse fibers in the second layer ranges between about 30:70 and 99:1. The second layer may include at least one of microfiber glass, glass, synthetic fibers, natural fibers, organic fibers, inorganic fibers, polymer fibers, cellulose fibers, and combinations thereof. A weight ratio of the coarse fibers to the microfibers in the multilayer non-woven mat, with respect to the total mat, ranges between 10:90 and 90:10. This layer of non-woven web of fibers, formed out of a combination of coarse fibers and microfibers, has an air permeability that is lower than the first air permeability due to the inclusion of microfibers. Thus less bleed through is expected through the layer formed out of a combination of coarse fibers and microfibers as compared with the first layer comprising coarse fibers described above and having the first air permeability.

In another embodiment, the second layer 370 may be formed entirely of microfibers 322 having an average fiber diameter of between 0.5 μm and 5 μm, and more commonly between 0.5 μm and 4 μm. The second layer 370 may be formed from a single, relatively uniform, microfiber size or the second layer 370 may be formed from a combination of differently sized microfibers 370, or the second layer 370 may be formed from a combination of microfibers and coarse fibers, which are typically homogenously dispersed or distributed throughout the second layer 370. For example, the second layer 370 may be formed from a first type of microfibers 322 having an average diameter between 0.5 μm and 1 μm, which is then mixed with a second type of microfibers 322 having an average diameter between 3 μm and 5 μm, or between 3 μm and 4 μm. In another example, the second layer 370 may be formed from a type of microfibers 322 having an average diameter between 3 μm and 5 μm, or between 3 μm and 4 μm, which is then mixed with a type of coarse fibers 322 having an average diameter between 11 μm and 16 μm. The weight percentages of the first and second types of microfibers 322 may vary in the second layer 370. For example, the percentage by weight of the first type of microfiber 322 may vary between 5 and 50 percent while the second type of microfiber 322 may vary between 50 and 95 percent. The second layer of non-woven web of fibers, wherein the second layer comprises microfibers having an average diameter of from about 0.5 μm to about 5 μm, or between 0.5 μm and 4 μm, has a second air permeability that is lower than the first air permeability. In some embodiments, the second air permeability is at least 40% lower than the first air permeability. In other embodiments, the second air permeability is at least 35% lower than the first air permeability. In yet other embodiments, the second air permeability is at least 30% lower than the first air permeability. More commonly, the second air permeability is at least 25% lower than the first air permeability. The second layer having the second air permeability absorbs less active material, in other words, there is less bleed through of active material through the second layer as compared with the first layer having the first air permeability.

The multilayer non-woven mat 350 (and similarly for mats as described above, e.g., 30, 50, and/or 60) includes a binder that binds the respective fibers together in the first layer 360 and in the second layer 370 and that also bonds the first layer 360 and the second layer 370 together. In one embodiment, the multilayer non-woven mat 350 includes a single binder that functions to both bind the fibers together in the respective layers and bond the respective layers together. The binder is typically homogenously or relatively evenly dispersed or distributed throughout the multilayer non-woven mat 350. Stated differently, the binder may be distributed homogenously within the first layer 360 and the second layer 370 and may also be homogenously distributed through the first and second layers 360, 370. Since the binder is relatively evenly distributed through the multilayer non-woven mat 350 in this manner, the multilayer non-woven mat 350 does not include a separate binder, or a layer of binder, at an interface between the first layer 360 and the second layer 370. Stated differently, there is not a concentration of a binder at an interface or boundary between the first and second layers 360, 370 since the binder is evenly distributed through the multilayer non-woven mat 350. This even distribution of the binder results from the formation of the first and second layers 360, 370 in a single step. In addition, the fibers of the first and second layers 360, 370 are more integrated, intertwined, and intermeshed with one another at the interface or boundary of the layers due to the formation of the layers in a single step. This results in more gradual transition between the first and second layers 360, 370. Since the first and second layers 360, 370 include a single binder that functions to both bind the fibers together and to bond the respective layers together, the fibers and layers are essentially unbonded until the application of the binder. As such, the intermingling or meshing of the fibers maintains the layers and fibers together prior to application of the single binder.

The multilayer non-woven mat 350 has outer surface 365 on layer 360 and outer surface 375 on layer 370, in which the surface 365 is opposite the surface 375. In some embodiments, the multilayer non-woven mat may be positioned within the battery as shown in FIG. 2. In some embodiments, one of surface 365 or 375 may be positioned near a surface of a positive electrode (e.g., electrode 20 as in FIG. 2) or positioned near a surface of negative electrode (e.g., negative electrode 40 as in FIG. 2). In some embodiments, one of surface 365 or 375 may be disposed partially or fully over the surface of negative electrode 40 so as to partially or fully cover the surface, partially or fully over the surface of positive electrode 20 so as to partially or fully cover the surface, or may be disposed on the outer and inner surfaces of the negative electrode 40 or on the outer and inner surfaces of the positive electrode 20, or may fully envelope or surround either electrode. For example, one of surface 365 or 375 may be positioned on the inner surface of the electrode 40 (i.e., adjacent separator 30 as in FIG. 2). Multilayer non-woven mat 350 or mats 350 may reinforce either or both of negative and positive electrodes and may provide an additional supporting component for the active material within the respective battery electrodes.

The multilayer non-woven mat 350 has a total thickness T between outer surface 365 of layer 360 and outer surface 375 of layer 370. In some embodiments, the multilayer non-woven mat 350 may have a total thickness T between about 0.1 mm and 3.0 mm, and more commonly between about 0.15 and 1.5 mm. The first and second layers 360, 370 may have different densities. The differences in densities may facilitate coupling of the multilayer non-woven mat 350 to an electrode while also blocking the active material from passing through (i.e., bleeding through) the multilayer non-woven mat 350. Total thickness T is a combined thickness of the thicknesses of layers 360 and 370. The first and second layers 360, 370 have respective thicknesses $t_1$, $t_2$. For example, the thickness $t_1$ of the first layer 360 may be between 0.1 and 1 mm, and the thickness $t_2$ of the second layer 370 may be between 0.1 and 0.5 mm. Each of these layers 360, 370 may also be defined as a percentage of the total multilayer non-woven mat thickness T. For example, the first layer 360 may be between 5 and 95 percent of the overall mat thickness T, and the second layer 370 may be between 95 and 5 percent of the overall mat thickness T. A ratio of a weight of the first layer to a weight of the second layer may range between 0.05 and 20. To prevent bleed through of the active material, the density of the second layer 370 may be proportional to the thickness of the second layer 370. For example, if the second layer 370 is more dense than the layer 360, then layer 370 may be thinner while still be effective to prevent bleed through. If the second layer 370 is too dense, however, the second layer 370 may not be open or porous enough to release moisture during curing, which might pose downstream issues during manufacturing of the battery and/or may increase the electrical resistance and therefore impair battery performance, such as less current or power outputs. The second layer 370 may be less dense when the layer 360 is a little thicker. The combination of the less dense and thicker mat may still be effective to prevent bleed through of the active material. The combination of density and thickness described herein provides a good balance that is effective to prevent bleed through without causing manufacturing difficulties. In another example, for a mat useful as AGM separator, the total thickness may be T may be less than 10 mm, or less than 5 mm, or more commonly less than 3 mm.

The thickness $t_1$ of the first layer 360 may be greater than the thickness $t_2$ of the second layer 370 because the first layer 360 may include more coarse fibers 320. Furthermore, because the first layer 360 includes coarse fibers 320 the density of the first layer 360 may be less than the second layer 370. The use of the coarse fibers 320 in the first layer 360 may render the first layer 360 more porous than the second layer 370. For example, the first layer 360 may have a Frasier air permeability of greater than or equal to 1000 cubic feet per minute per square feet (cfm/ft$^2$) when measured against a pressure drop of 0.5 in of water. The second layer 370 may have a Frasier air permeability of less than or equal to 600 cfm/ft$^2$ when measured according to the same standard. The less dense first layer 360 allows the active material to penetrate into the first layer 360 when the multilayer non-woven mat 350 is applied to or disposed within an electrode during manufacturing of the battery 10 (as in FIGS. 1 and 2). Specifically, the active material 26 or 46 may be relatively wet or unhardened and may absorb or penetrate into the first layer 360 due to the porosity of the first layer 360. The penetration or absorption of the active material 26 or 46 into the first layer 360 may bind the active material to the mat 350 during battery manufacturing. However, because the second layer 370 includes microfibers 322 the second layer 370 is more dense than the first layer 360; the second layer 370 may therefore block the active material 26 or 46 from passing through the mat 350 when the mat 350 is loaded with active material 26 or 46 during manufacture of the battery 10. The use of a significant amount of microfibers 322 in the second layer 370 renders the second layer 370 significantly less porous than the first layer 360 which blocks or prevents the active material 26 or 46 from bleeding through the second layer 370 to an exterior surface of the mat 350 where it may negatively affect processing. For example, when significant bleed through occurs, the electrode may stick to another electrode if the electrodes are not completely dry, which is sometimes referred to as "bricking". Bleed through may also leave residual lead paste on the equipment, resulting in more frequent clean-up or downtime. The inclusion of a significant amount of microfibers 322 in the second layer 370 allows the second layer 370 to exhibit a Frasier air permeability of less than or equal to 300 cfm/ft$^2$. The active material 26 or 46 may absorb fully through the first layer 360 and partially through the second layer 370. The use of the microfibers 322, however, prevents bleed through of the active material 26 or 46 to the exterior surface of the mat 350. In this way, the multilayer non-woven mat 350 is able to form a mat to prevent leakage of active material 26, 46 of battery 10 while bonding to the electrode 20, 40.

Figure 4:
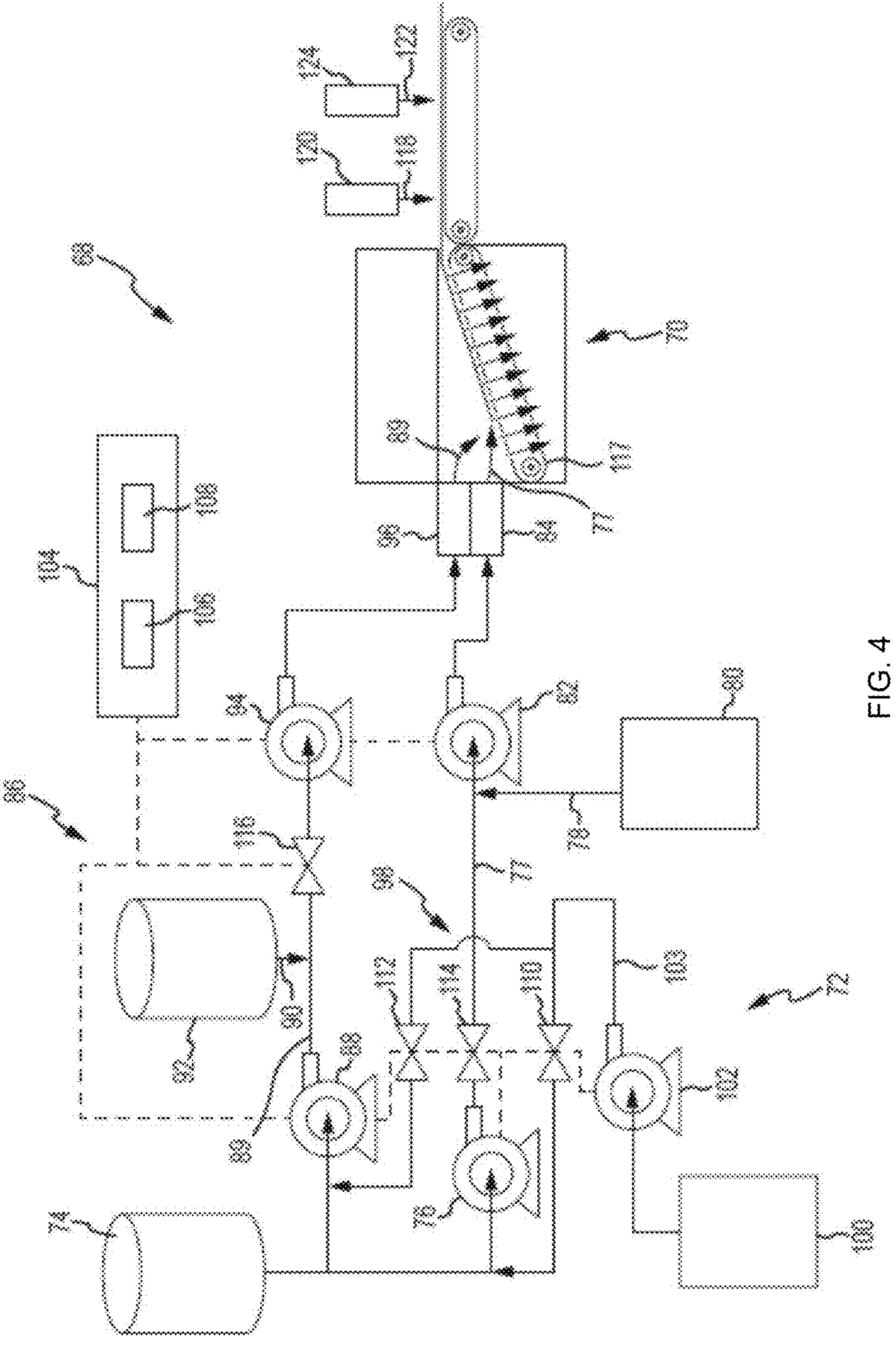
FIG. 4 is a schematic view of a manufacturing system that produces a non-woven mat.

FIG. 4 is a schematic view of a manufacturing system 68 that produces a multilayer non-woven mat 350 and similarly for mats as described above, e.g., 10, 30, 50, and/or 60. In operation, the manufacturing system 68 is able to produce a multilayered non-woven mat in a single step/process. That is the layers of the non-woven mat are not separately formed and then combined at a later stage or process (i.e., separately made and then bonded together). The non-woven mat 350 produced by the manufacturing system 68 may therefore be produced at lower cost and in less time.

The manufacturing system 68 includes multiple fluid lines that deliver coarse fibers and microfibers to a hydroformer 70 that simultaneously forms the first and second layers 360, 370 of the multilayer non-woven mat 350. While a hydroformer 70 is illustrated, a fourdinier wire or a delta former may also be used to produce first and second layers 360, 370 of the multilayer non-woven mat 350 in a single step/process. By simultaneously forming two wet laid mats on top of each other, interface entanglement of individual fibers from the two different fiber compositions (the fiber composition of the first layer being different than the fiber composition of the second layer) results in the two layers being mechanically bonded together. Additionally, a single binder is applied simultaneously and distributed throughout both fiber layers. This provides advantages over conventional mats of more than one layer that are formed separately and then laminated, glued, or otherwise joined together after forming. At least one of the advantages not achievable by conventional mat forming methods is that the multilayer non-woven mat described herein does not have a separate binder material or a layer of binder at an interface between the two layers, i.e., the multilayer non-woven mat has a seamless interface. Another advantage that the multilayer non-woven mat described herein is an integrally formed product that does have entanglement between fibers of the two layers as well as a distribution of a single binder throughout the multilayered mat. Both of these features provide a multilayer non-woven mat having good peel strength that is not susceptible to separation/delamination.

The manufacturing system 68 produces the first layer 360 using a first fluid line 72 that delivers coarse fibers to the hydroformer. The first fluid line 72 includes at least one coarse fiber source 74 containing one or more types of coarse fibers (e.g., differently sized coarse fibers, coarse fibers made from different materials, or a combination thereof). Fluidly coupled to the coarse fiber source 74 is a pump 76 (e.g., a thick stock pump) that pumps a first fluid 77 containing the coarse fibers. For example, the first fluid 77 may include water, viscosity modifiers, dispersants, defoamers, etc. mixed with the coarse fibers. After passing through the pump 76, the first fluid 77 is diluted with a dilution fluid 78 (e.g., water, viscosity modifiers, dispersants, defoamers, or a combination thereof) stored in a dilution tank 80. By diluting the coarse fibers, the manufacturing system 68 may enable a more even distribution of the coarse fibers in the first layer 360 by the hydroformer. The dilution fluid 80 combines with the first fluid 77 before the first fluid 77 enters a second pump 82. The pump 82 (e.g., thin stock pump) may facilitate mixing of the first fluid 77 and the dilution fluid 80 before delivery to the hydroformer 70. After exiting the pump 82, the first fluid 77 enters a first inlet pipe 84 of the hydroformer 70. The first inlet pipe 84 directs the first fluid 77 into the hydroformer 70, which forms the first layer of the multilayer non-woven mat 350 by removing the first fluid 77 and dilution fluid 80 from the fluid/coarse fiber mixture as the mixture is poured onto the hydroformer 70.

In order to form the second layer 370 of the multilayer non-woven mat 350, the manufacturing system 68 includes a second fluid line 86. The second fluid line 86 includes at least one coarse fiber source 74 containing one or more types of coarse fibers (e.g., differently sized coarse fibers, coarse fibers made from different materials, or a combination thereof). Fluidly coupled to the coarse fiber source 74 is a pump 88 (e.g., a thick stock pump) that pumps a second fluid 89 containing the coarse fibers. For example, the second fluid 89 may include water, viscosity modifiers, dispersants, defoamers, etc. mixed with the coarse fibers. After passing through the pump 88, the second fluid 89 is diluted with a dilution fluid 90 (e.g., water, viscosity modifiers, dispersants, defoamers, or a combination thereof) stored in a dilution tank 92. By diluting the second fluid 89, the manufacturing system 68 may enable even distribution of the fibers in the second layer 370. The dilution fluid 90 combines with the second fluid 89 before the second fluid 89 enters a second pump 94. The pump 94 (e.g., thin stock pump) enables mixing of the second fluid 89 and the dilution fluid 90 before delivery to the hydroformer 70. After exiting the pump 94, the second fluid 89 enters a second inlet pipe 96 of the hydroformer 70. The second inlet pipe 96 directs the second fluid 89 into the hydroformer 70, which forms the second layer 370 of the multilayer non-woven mat 350 by removing the second fluid 89 and dilution fluid 90 from the fluid/fiber mixture as the mixture is poured onto the hydroformer 70 atop the first layer of the multilayer non-woven mat 350 that was immediately formed by the hydroformer. The second fluid 89 is directed or poured atop the first layer of the multilayer non-woven mat 350 as the fluid is being drained from the first fluid 77 such that the second layer 370 and the first layer 360 are formed simultaneously by the hydroformer.

Fluidly coupled to both the first and second fluid lines 72, 86 is a third fluid line 98. The third fluid line 98 includes at least one microfiber source 100 containing one or more types of microfibers (e.g., differently sized microfibers, microfibers made from different materials, or a combination thereof). Fluidly coupled to the microfiber source 100 is a pump 102 (e.g., a stock pump) that pumps a third fluid 103 containing the microfibers. The third fluid 103 may include water, viscosity modifiers, dispersants, defoamers, etc. mixed with the microfibers. After passing through the pump 102, the third fluid 103 may be pumped into the first and/or second fluid lines 72, 86. In this way, microfibers may be mixed with coarse fibers to increase the density of either the first and/or second layers 360, 370. As illustrated, the third fluid line 98 couples upstream from the pumps 76 and 88. By coupling upstream from the pumps 76 and 88, the manufacturing system 68 uses the turbulent flow through the pumps 76 and 88 to facilitate mixing of the third fluid 103 with the first and/or second fluids 77, 89. However, in some embodiments, the third fluid line 98 may couple to the first and second fluid lines 72, 86 downstream from the pumps 76 and 88. For example, the manufacturing system 68 may rely on the pumps 82 and 94 to mix the third fluid 103 with the first or second fluids 77, 89. In still other embodiments, the third fluid line 98 may couple upstream as well as downstream of the pumps 76 and 88. This layout may enable the gradual introduction of the third fluid into the first and/or second fluid lines at different locations.

The flow of the first, second, and third fluids 77, 89, 103 through the manufacturing system 68 may be controlled with a controller 104. The controller 104 may include one or more processors 106 that execute instructions stored on one or more memories 108 to control the operation of various valves as well as the pumps. For example, the third fluid line 98 may include first and second valves 110, 112. As illustrated, the first valve 110 controls the flow of the third fluid into the first fluid line 72, while the second valve 112 controls the flow of the third fluid into the second fluid line 86. By controlling the first and second valves 110, 112 the controller 104 is able to control the amount of the third fluid combining with the first and/or second fluids 77, 89. This in turn controls the amount of microfibers in the first and second layers 360, 370 produced in the hydroformer 70. In this way, the manufacturing system 68 may vary the microfiber content in the first and second layers 360, 370 to between 0 and 100 percent, and more commonly to the percentages described in the multilayer non-woven mat embodiments herein.

The manufacturing system 68 may also control the fluid flow through the first and second fluid lines 72, 86 using additional valves 114 and 116 as well as controlling the pumps 76, 82, 88, 94, and 102. By controlling the flow of the first and second fluids 77, 89 the controller 104 may increase or decrease thickness of the respective first and second layers 360, 370. Stated differently, the manufacturing system 68 may increase or decrease the thickness of the first and/or second layers 360, 370 of the multilayer non-woven mat 350 depending on the type of desired multilayer non-woven mat 350. For example, the manufacturing system 68 may increase the flow of the first fluid 77 through the fluid line 72 to increase the thickness of the first layer 360 and decrease the flow of the second fluid 89 to decrease the thickness of the second layer 370. Similarly, the manufacturing system 68 may decrease the flow of the first fluid 77 through the fluid line 72 to decrease the thickness of the first layer 360 and increase the flow of the second fluid 89 to increase the thickness of the second layer 370.

As the first and second fluids 77, 89 enter the hydroformer 70 they contact a conveyer belt 117 that drains a substantially majority of the fluid in the first and second fluids 77, 89 leaving behind the combined first and second layers 360, 370. The manufacturing system 68 may then apply one or more binders 118. In some embodiments, the binder 118 may include additives, such as flame resistant resinous binders such as urea formaldehyde, modified urea formaldehyde, acrylic resins, modified acrylic resins, polyurethanes, polyvinyl chlorides, melamine resins, homopolymers or copolymers of polyacrylic acid; crosslinking acrylic copolymers; crosslinked vinyl chloride acrylate copolymers (e.g., copolymers having a GTT of about 113° C. or less), among other types of binders. Flame retardants may also be included in the binder, such as Alumina trihydrate, organic phosphonates, Antimony oxide, and the like.

These binders 118 may be stored in one or more binder sources 120. The binder(s) 118 may be applied to the first and second layers 360, 370 by moving the first and second layers 360, 370 under a spray or waterfall of binder. Any excess binder may then flow through the first and second layers. In this way, the manufacturing system 68 may bind the fibers in their respective layers as well as bind the layers 360, 370 together without performing multiple binding steps/processes. Stated differently, the manufacturing system 68 may simultaneously bind the fibers in the respective layers and bond the fibers layers together in a single step. The application of the binder(s) 118 to the first and second layers 360, 370 simultaneously results in the binder being relatively evenly distributed through and between the first and second layers 360, 370 without forming or defining a binder layer between the first and second layers 360, 370. Stated differently, a separate or individual layer of binder is not formed or defined at an interface or boundary between the first and second layers 360, 370 as occurs in conventional systems where the layers are formed individually and combined in a subsequent process. The relatively even distribution of the binder(s) 118 may increase the strength of the multilayer non-woven mat and/or reduce issues such as delamination of the layers. In addition, the multilayer non-woven mat described herein has a less defined boundary between the first and second layers 360, 370 since these layers are simultaneously formed. Rather, the multilayer non-woven mat has a relatively gradual transition from the first layer 360 to the second layer 370 due to the simultaneous formation of the layers, which may increase the strength and/or reduce issues such as delamination of the layers.

For convenience in describing the various embodiments herein, the fibers were referred to as glass fibers—i.e., coarse glass fibers, microfibers, and the like. It should be realized that various other fiber types may be used in any of the embodiments described herein and that the embodiments are not limited solely to glass fibers unless otherwise specified in the claims. It should also be realized that the use of non-glass fibers are contemplated as being used in any of the embodiments. The non-glass fibers may be used in combination with glass fibers or instead of glass fibers. Accordingly, unless otherwise explicitly specified in the claims, the concepts and embodiments described herein may include only glass fibers, only non-glass fibers, or any combination of glass and non-glass fibers. Exemplary non-glass fibers include polymer fibers, synthetic fibers, organic fibers, inorganic fibers, natural fibers, cellulose fibers, and the like. Similarly, it should be understood that the glass microfibers and/or glass coarse fibers described herein can be partially or completely replaced with polymeric, synthetic, or natural microfibers. Thus, the general term “fibers”, “coarse fibers”, and/or “microfibers” may be used in the claims with such usage being understood to cover a variety of fibers including glass fibers and non-glass fibers. The terms “coarse fibers” and “microfibers” will be understood in relation to size to have the definitions provided herein.

Figure 5:
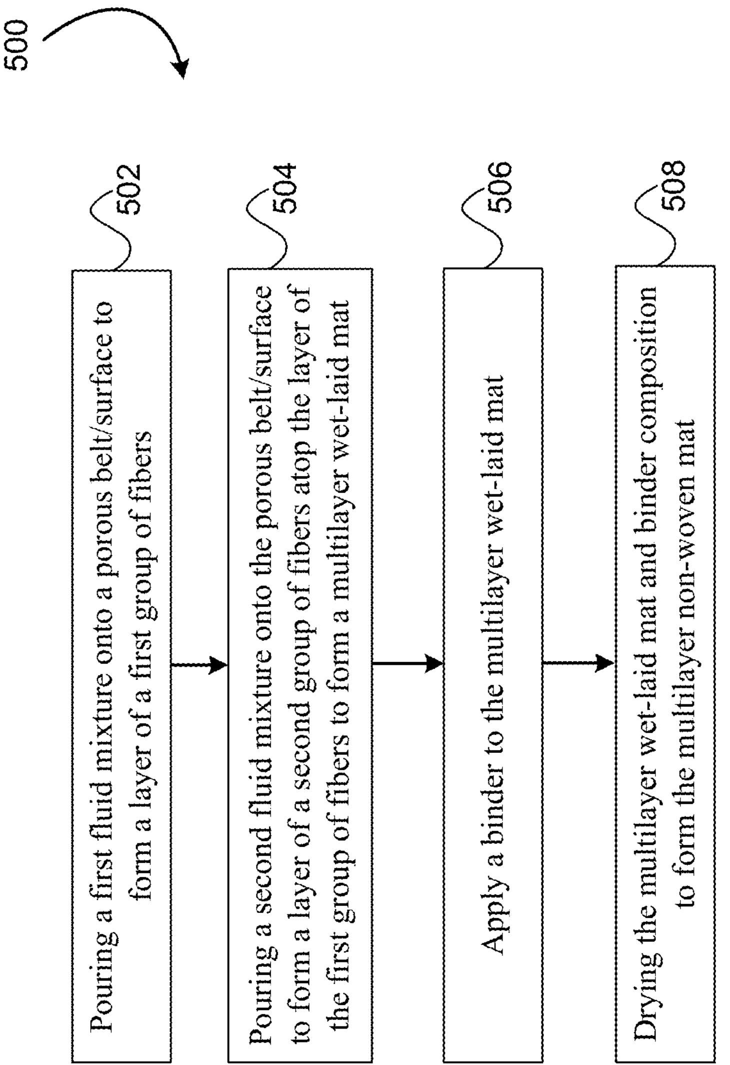
FIG. 5 is a method of forming a multilayer non-woven mat.

Referring now to FIG. 5, illustrated is a method 500 of forming a multilayer non-woven mat. In a specific embodiment, the multilayer non-woven mat may be a pasting paper or a separator for a LA battery. At block 502, a first fluid mixture is poured or applied onto a porous belt or surface. The first fluid mixture includes a first group of fibers that are homogenously mixed or dispersed within a first fluid. In a specific embodiment, the first group of fibers comprise or consist of coarse glass fibers having an average fiber diameter of between 6 μm and 25 μm, or between 8 μm and 25 μm. In other embodiments, the first group of fibers comprise or consist of a combination of coarse fibers and microfibers as described herein. When the first fluid mixture is applied or poured atop the porous belt or surface, the first fluid is drained or removed from the first fluid mixture so that a layer of the first group of fibers is formed atop the porous belt or surface. In some embodiments a vacuum may be applied to the porous belt or surface to facilitate in removal of the first fluid from the first fluid mixture.

At block 504, a second fluid mixture is poured or applied onto the porous belt or surface atop the layer of the first group of fibers. The second fluid mixture includes a second group of fibers that are homogenously mixed or dispersed within a second fluid. In a specific embodiment, the second group of fibers comprise or consist of a combination of coarse glass fibers having an average fiber diameter of between 6 μm and 25 μm, or between 8 μm and 25 μm, and glass microfibers having an average fiber diameter of between 0.5 μm and 5 μm, or between 0.5 μm and 4 μm. The amount of each fiber type may be similar to the embodiments described herein. In another embodiment, the second group of fibers comprises or consists entirely of glass microfibers having an average fiber diameter of between 0.5 μm and 5 μm, or between 0.5 μm and 4 μm.

When the second fluid mixture is applied or poured atop the porous belt or surface, the second fluid is drained or removed from the second fluid mixture so that a layer of the second group of fibers is formed atop the porous belt or surface and atop the layer of the first group of fibers. The second fluid mixture is poured or applied onto the porous belt or surface as the first fluid is being removed from the first fluid mixture. As such, the layer of the first group of fibers is typically not fully formed or defined until after the second fluid mixture is poured or applied onto the porous belt or surface. In this manner, the layer of the first group of fibers and the layer of the second group of fibers are formed simultaneously atop the porous belt or surface. The second fluid mixture may be poured directly vertically above the first fluid layer and thus, both layers may be poured simultaneously atop each other. Stated differently, since the layer of the first group of fibers is not fully formed or defined until after the second fluid mixture is poured or applied onto the porous belt or surface, the layer of the first group of fibers is formed or defined at essentially the same time as the layer of the second group of fibers is formed or defined atop of the porous belt or surface. Since the layer of the first group of fibers and the layer of the second group of fibers are formed simultaneously, the degree of intermeshing or entangling of the fibers at the interface of the two layers is significantly greater than in conventional fiber mats where one or both of the layers are fully formed or defined prior to application of the other layer. In some embodiments, the second fluid mixture may be poured or applied onto the porous belt or surface within 30 inches of where the first fluid mixture is poured or applied onto the porous belt or surface. In such instances, the fiber mat forming section (i.e., porous belt) may be extremely long such that the first layer is still dewatering when the second fluid mixture is applied to the belt. In other instances, the second layer may be poured within 12 inches or within 6 inches after the first layer is poured or applied to the porous belt. In such instances, the first layer may be partially dewatered, but still in the process of forming on the porous belt. In some embodiments, the second layer 18 (e.g., a more dense layer) may be poured atop the porous belt first and then the first layer 16 (e.g., a less dense layer) may be poured atop the second layer 18. In such instances, a more dense layer may be formed on the bottom while a less dense layer is simultaneously formed on the top.

At block 506, a binder is simultaneously applied to the layer of the first group of fibers and the layer of the second group of fibers in order to bind the two layers together and to bind the various fibers within each layer together. In most embodiments, a binder is not applied to either layer prior to block 506, or stated differently, the layers are typically free of a binder prior to block 506. The simultaneous application of the binder to the two layers, which are typically free of a binder prior to block 506, results in a more homogenous or uniform distribution of the binder throughout the fiber mat. In addition, the simultaneous application of the binder to the two layer results in the fiber mat being free of a concentrated binder layer at the interface of the two layers. Conventional fiber mats typically include a binder concentration at the interface between layers because the fiber layers are formed separately and then adhered or bonded together via an additional binder. The additional binder bonds the two layers together and is typically concentrated at the interface between the two layers. In contrast, the process described herein is able for form a multiple layer fiber mat construction in which the binder is relatively homogenously or uniformly dispersed throughout the mat rather than being concentrated in one or more areas. In addition, a single binder may be employed to both bond or adhere the layers together and bond or adhere the fibers of the various layers together. Conventional mats commonly require the use of multiple binders in order to bond the fibers of the separate layers together and to subsequently bond the layers together. For example, two mats can be mechanically glued together as a post-treatment step.

At block 508, the wet-laid mat and binder composition is dried to form the multilayer non-woven mat. Drying the mat may include blowing air at least partially through the multiple fiber layers or by using drum dryers by direct or substantially direct contact. In some embodiments, the wet-laid mat and binder composition is subjected to temperatures of 250-450 or 500° F. (121-232 or 260° C.) for periods usually not exceeding 1-2 minutes and as little as a few seconds.

In a specific embodiment, the multilayer non-woven mat that is formed according to the method 500 of FIG. 5 may be a pasting paper or a separator in a LA battery. In such embodiments, the multilayer non-woven mat may be applied to or within an electrode during formation of the battery. The layer of the first group of fibers may be capable of absorbing active material when positioned adjacent or within one of the positive or negative electrodes during formation of the LA battery. For example, the active material of the active material layer may penetrate through the first exterior surface of the non-woven glass mat to be disposed in the layer of the first group of fibers. The layer of the second group of fibers may partially absorb the active material of the electrode, but may block the material from passing or absorbing through the multilayer non-woven mat to an exterior surface of the second layer thereby preventing bleeding of the active material during manufacture, transport, storage, and use. The layer of the second group of fibers may have a lower air permeability than the layer of the first group of fibers. By having layers of varying air permeability, the multilayer non-woven mat is advantageously configured to limit penetration of the active material through the second exterior surface of the non-woven glass mat. In some embodiments, the mat may further include a filler such as silica or carbon. Silica may be added in the mat to improve its wettability in acid. Carbon may be added to improve battery performance, especially DCA (Dynamic Charge Acceptance). In a non-limiting example, Hi-Sil 233 silica (from PPG) is added as filler to the binder to make the microfiber rich layer more closed up, or less porous, and wettable. In another example, functional fibers such as carbon fibers may be added to one or more layers of the multilayer non-woven mat. A separator may include a multilayer non-woven mat thickness from about 0.1 mm to about 3.0 mm, and more commonly from about 0.2 mm to about 1.0 mm.

It should be noted that while the method 500 of FIG. 5 is described as simultaneously forming two layers, the method 500 could be employed to simultaneously form three or more layers as described. For example, block 504 could be repeated with a third fluid mixture, a fourth fluid mixture, and the like to form additional layers atop the layer of the second group of fibers. The binder could then be simultaneously applied to each of the layers at block 506 as desired. Thus, the method 500 of FIG. 5 is not limited to two layer constructions.

Suitable coarse fibers useful in the multilayer non-woven mats described include but are not limited to K249T glass fibers (Johns Manville, Denver, CO) with a nominal fiber diameter of about 13 μm and a length of ¾ inch. Fibers with good acid resistance can be suitable, such as T glass and C glass from Johns Manville, Advantex from Owens Corning. Suitable microfibers useful in the present disclosure include but are not limited to 206-253 glass fibers (Johns Manville, Denver, CO) with a nominal fiber diameter of about 0.765 μm, 210x-253 glass fibers (Johns Manville, Denver, CO) with a nominal fiber diameter of about 3.0 μm, Unbleached Electrical (UBE) cellulose fibers from Canfor pulp, and combinations thereof. The cellulose fibers typically have extreme levels of purity and low conductivity.

EXAMPLES

Example 1

Samples S1-S3 of multilayer non-woven mats are described in Table 1 below as are comparatives C1-C3.

TABLE 1

| Sample | Bulk Wt. (lb/sq) | Percentages XRF (%) M1 | C | S | Mat Composition (%) LOI | C | M1 | S | M1 + S | Mat Composition Wt. (lb/sq) M1 | S | M1 + S | Air Perm (cfm/ft²) | Acid Wick (cm) 10 min |
|---|---|---|---|---|---|---|---|---|---|---|---|---|---|---|
| Comp1 | 1.13 | 20 | 80 | 0 | 15.9 | 67.4 | 15.8 | 0.0 | 15.8 | 0.18 | 0.00 | 0.18 | 125 | 1.0 |
| Comp2 | 1.40 | 8 | 67 | 25 | 18.1 | 54.9 | 6.5 | 20.6 | 27.0 | 0.09 | 0.29 | 0.38 | 13 | 5.0 |
| Comp3 | 1.20 | 9 | 65 | 26 | 18.2 | 53.2 | 7.4 | 21.2 | 28.6 | 0.09 | 0.25 | 0.34 | 12 | 4.9 |
| S1 | 1.13 | 25 | 75 | 0 | 16.8 | 62.4 | 20.0 | 0.0 | 20.0 | 0 | 0.00 | 0.22 | 16 | 3.1 |
| S2 | 1.09 | 13 | 72 | 15 | 15.0 | 61.5 | 11.2 | 12.3 | 23.6 | 0.13 | 0.13 | 0.26 | 8 | 5.2 |
| S3 | 1.01 | 16 | 70 | 14 | 15.5 | 58.5 | 13.9 | 12.2 | 26.0 | 0.12 | 0.12 | 0.26 | 2.7 | 5.0 |

Comparative single layer non-woven mats Comp1-Comp3 were formed on a pilot wet-laid mat machine using a conventional single headbox configuration. Samples S1-S3 were formed using a pilot wet-laid mat machine having double headbox configuration. Each headbox had a different fiber stock inflow for delivering the two different fiber layers. The double headbox configuration provided one layer of web formed with the fibers from one fiber stock and another layer of web is formed above the first web by fibers from the other fiber stock. The following process steps were then performed including binder application, drying, and curing the same for S1-S3 and C1-C3.Process water with pH greater than 5 was used. All mats S1-S3 and Comp1-Comp3 contained the same organic binder. The coarse fibers, abbreviated as "C" on Table 1 were glass fibers type ¾" K249T (Johns Manville) with a nominal fiber diameter of about 13 μm and length of 0.75 inch. The microfibers, abbreviated as "M1" on Table 1, were glass microfiber 206-253 (Johns Manville) with a nominal fiber diameter of about 0.765 μm. Mats S2-S3 and Comp2-Comp3 also contained Hi-Sil 233 silica (PPG) added into the binder and is abbreviated "5" on Table 1. LOI of the mat was measured by burning out organics in the oven at 500° C. for at least 30 min. The remaining mixture (organic free) was used for XRF analysis to measure percentages of coarse fibers "C", microfibers "M1", and silica "5". The mat composition was then calculated. The air permeability of the mats was measured by the Frazier test according to ASTM Standard Method 0737, with the results given in units of cubic feet per minute per square foot (cfm/ft$^2$). The test was carried out at a differential pressure of about 0.5 inches of water. The wicking strength/length, or capillary rise, was measured according to IS08787 with the exception that the wicking medium was 40 wt. % sulfuric acid instead of water. For Comp1-Comp3, each of the two fiber stock streams contained either coarse fibers or a mix of coarse fibers and microfibers. Silica was carried in the binder. For S1-S3, a first fiber stock contained 60% of the total coarse fibers "C" to form a web bottom layer and a second fiber stock contained 40% of the total coarse fibers "C" and all of the microfibers "M1" to form the mat top layer. Mats S1-S3 having the multilayer construction demonstrated lower air permeability numbers as compared with Comp1-Comp3, respectively even with less filler and/or microfibers. In addition, the bi-layer mats have similar or better wicking strength than their respective comparative.

Example 2

Samples S4-S5 are multilayer non-woven mat rolls as described in Table 2 below.

TABLE 2

| Sample Roll | C:M2 | Binder LOI (%) | CMD Tensile (lbf/3") | MD Tensile (lbf/3") | Air Perm (cfm/ft$^2$) | Square Foot Weight (g/ft2) | Thickness (mil) | Total Tensile (lbf/3") |
|---|---|---|---|---|---|---|---|---|
| S4 | 60%:40% | 43.2 | 24.8 | 34.9 | 391.2 | 2.79 | 8.6 | 59.8 |
| S5 | 50%:50% | 45.3 | 21.2 | 27.8 | 263.7 | 2.73 | 8.2 | 49.0 |

Sample rolls S4-S5 were formed using a production Hydroformer™ wet-laid mat machine having double headbox configuration. The coarse fibers, abbreviated as "C" on Table 2 were glass fibers type ¾" K249T (Johns Manville) with a nominal fiber diameter of about 13 μm and length of 0.75 inch. The microfibers, abbreviated as "M2" on Table 2, were glass microfiber 210X-253 (Johns Manville) with a nominal fiber diameter of about 3.0 μm. Rolls S4-S5 contained no silica filler. For example, roll S4 contained 43.2% binder and 56.8% fibers and the fiber content ¾" K249 T: Microfiber 210X-253, or C:M2, was 60%: 40% for the total mat multilayer construction. Roll S5 contained 45.3% binder and 54.7% fibers and the fiber content ¾" K249 T: Microfiber 210X-253, or C:M2, was 50%: 50% for the total mat multilayer construction. For rolls S4 and S5, all of the microfibers M2 were in the fiber stock fed to the top layer, which had a M2:C glass ratio of 90%:10%. The fiber stock fed to the bottom layer was 100% C. In other words, the top layer is microfiber rich and bottom layer is T glass, coarse fiber rich. Variable contemplated for multilayer non-woven mat designs include the weight ratio of the top layer vs. the bottom layer, the ratio of coarse fibers to microfibers for each layer, and the configuration of having the microfiber rich layer either as the top layer or the bottom layer.

Air permeability was measured by the Frazier test according to ASTM Standard Method D737 with the testing performed at a differential pressure of about 0.5 inches of water (125 Pa) to provide the porosity measurements. Thickness was measured with a gauge under pressure of 1.868 kPa. Tensile strength of 3" wide samples were measured according to TAPPI T494 OM-88 test method "Tensile breaking properties of paper and paperboard using constant rate of elongation apparatus" using an Instron machine. Tensile strength was measured in the machine direction (MD) and the cross-machine direction (CMD).

The non-woven mat material of rolls S4 and S5 were trialed for electrode plate pasting in battery manufacture, and it was found that the microfiber rich layer (M2) being in contact with the electrode plate material demonstrated that less bleed through was observed as compared with if the T glass (C) rich layer were in contact with the electrode plate material. The layer rich in microfibers (M2) in contact with the electrode plate material reduced bleed-through for improved battery performance. It was also found that the T glass (C) rich layer being in contact with the electrode plate material demonstrated better adhesion between the electrode plate and the non-woven mat, which can benefit processing.

Example 3

Samples S6-S11 of multilayer non-woven mats are described in Table 3 below.

TABLE 3

| Sample ID | Basis weight (lb/Sq) | LOI (%) | Tensile MD (lbs/3") Avg | Tensile MD (lbs/3") Stdev | Tensile CD (lbs/3") Avg | Tensile CD (lbs/3") Stdev | Thickness (mils) Avg | Thickness (mils) Stdev | Air Perm (cfm/ft$^2$) Avg | Air Perm (cfm/ft$^2$) Stdev | Total Tensile (lbs/3") |
|---|---|---|---|---|---|---|---|---|---|---|---|
| S6 | 0.64 | 70.9 | 28.39 | 1.22 | 17.03 | 0.88 | 8.81 | 0.17 | 255.13 | 35.72 | 45.42 |
| S7 | 0.63 | 70.0 | 25.94 | 1.65 | 15.78 | 0.67 | 9.17 | 0.11 | 277.25 | 37.09 | 41.73 |
| S8 | 0.70 | 71.3 | 29.32 | 2.01 | 15.96 | 1.57 | 9.59 | 0.16 | 224.88 | 20.88 | 45.28 |
| S9 | 0.55 | 68.3 | 20.47 | 0.97 | 12.73 | 0.81 | 9.76 | 0.23 | 303.50 | 24.77 | 33.20 |
| S10 | 0.60 | 67.5 | 22.61 | 0.51 | 13.83 | 0.43 | 10.52 | 0.14 | 305.75 | 9.98 | 36.44 |
| S11 | 0.62 | 63.6 | 16.49 | 3.85 | 13.16 | 0.61 | 10.28 | 0.22 | 299.88 | 19.81 | 29.64 |

Samples S6-S11 were formed using a pilot wet-laid mat machine having double headbox configuration. All samples S6-S11 had a fiber content including 50% coarse fibers and 50% cellulose fibers. The coarse fibers were glass fibers type ¾" K249T (Johns Manville) with a nominal fiber diameter of about 13 μm and length of 0.75 inch. The microfibers were UBE cellulose fibers (Canfor Pulp). The feed stocks were configured so that the top layer included all of the cellulose fibers with the top layer having 80% cellulose and 20% ¾" K249 T, and the bottom layer including coarse fibers 100% ¾" K249 T.

Air permeability was measured by the Frazier test according to ASTM Standard Method D737 with the testing performed at a differential pressure of about 0.5 inches of water (125 Pa) to provide the porosity measurements. Thickness was measured with a gauge under pressure of 1.868 kPa. Tensile strength of 3" wide samples were measured according to TAPPI T494 OM-88 test method using an Instron machine. Tensile strength was measured in the machine direction (MD) and the cross-machine direction (CMD).

The multilayer non-woven mats S6-S11 having cellulose fibers in a single layer provided high wickability and reduced air permeability as compared with a mat construction having cellulose fibers homogeneously distributed into each of two layers or in a single layer mat construction.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms “a”, “an”, and “the” include plural referents unless the context clearly dictates otherwise. Thus, for example, reference to “a process” includes a plurality of such processes and reference to “the device” includes reference to one or more devices and equivalents thereof known to those skilled in the art, and so forth.

Also, the words “comprise,” “comprising,” “include,” “including,” and “includes” when used in this specification and in the following claims are intended to specify the presence of stated features, integers, components, or steps, but they do not preclude the presence or addition of one or more other features, integers, components, steps, acts, or groups.

What is claimed is:

1. A bilayer non-woven pasting mat for a lead-acid battery, comprising:

a first layer of non-woven web of fibers comprising coarse fibers having an average fiber diameter from about 6 μm to about 25 μm, the first layer of non-woven web of fibers defining an exterior surface of the bilayer non-woven pasting mat and an interior surface;

a second layer of non-woven web of fibers comprising microfibers having an average diameter of about 3 μm, the second layer of non-woven web of fibers being positioned so that the second layer of non-woven web of fibers directly contacts the first layer of non-woven web of fibers; and a single binder that simultaneously bonds the coarse fibers in the first layer together, bonds the microfibers in the second layer together, and that bonds the first layer to the second layer, wherein the coarse fibers, the microfibers, the first layer, and the second layer are unbonded prior to application of the single binder;

wherein the coarse fibers of the first layer and the microfibers of the second layer are integrated, intertwined, and intermeshed with one another at an interface or boundary of the first layer and the second layer;

wherein the coarse fibers and microfibers gradually transition between the first layer and the second layer;

wherein the first layer of non-woven web of fibers absorbs an active material of an electrode of the lead acid battery;

wherein the second layer of non-woven web of fibers blocks the active material of the electrode from passing through the non-woven pasting mat;

wherein the single binder is an acrylic based emulsion;

wherein at least one of the first layer and the second layer further comprise a filler material including at least one of silica and carbon, wherein the filler material comprises between about 0.1 wt. % and 30 wt. % of a total weight of the non-woven pasting mat;

wherein the first layer has a first air permeability and the second layer has a second air permeability, wherein the second air permeability is at least 25% lower than the first air permeability;

wherein the first layer and the second layer are the only fiber layers in the bilayer non-woven pasting mat;

wherein the first layer of non-woven web of fibers comprises microfibers having an average diameter from about 0.5 μm to about 5 μm, wherein a weight ratio of the coarse fibers to the microfibers in the first layer ranges between about 70:30 and 99:1; and wherein the second layer of non-woven web of fibers further comprises coarse fibers having an average diameter from about 6 μm to about 25 μm, and wherein a weight ratio of the microfibers to the coarse fibers in the second layer ranges between about 30:70 and 99:1.

2. The bilayer non-woven pasting mat of claim 1, wherein one of the first layer and the second layer is configured to be in contact with a plate material of the electrode.

3. The bilayer non-woven pasting mat of claim 1, wherein the microfibers in the first layer, the second layer or both layers comprise at least one of microfiber glass, synthetic fibers, natural fibers, organic fibers, inorganic fibers, polymer fibers, and cellulose fibers.

4. The bilayer non-woven pasting mat of claim 1, wherein the coarse fibers in the first layer, the second layer or both layers comprise at least one of glass, synthetic fibers, natural fibers, organic fibers, inorganic fibers, polymer fibers, and cellulose fibers.

5. The bilayer non-woven pasting mat of claim 4, wherein the coarse fibers comprise glass.

6. The bilayer non-woven pasting mat of claim 1, wherein a thickness of the non-woven pasting mat ranges between about 0.1 mm and 3.0 mm.

7. The bilayer non-woven pasting mat of claim 6, wherein a thickness of the non-woven pasting mat ranges between about 0.15 mm and 1.5 mm.

8. The bilayer non-woven pasting mat of claim 1, wherein the first layer is between 5 and 95 percent of a thickness of the bilayer non-woven pasting mat, and the second layer is between 95 and 5 percent of the thickness of the bilayer non-woven pasting mat.

9. The bilayer non-woven pasting mat of claim 1, wherein a ratio of a weight of the first layer to a weight of the second layer ranges between 0.05 and 20.

10. The bilayer non-woven pasting mat of claim 1, wherein the single binder comprises between about 0.5 wt. % and 60 wt. % of a total weight of the bilayer non-woven pasting mat.

11. The bilayer non-woven pasting mat of claim 10, wherein the single binder comprises between about 5.0 wt. % and 50 wt. % of a total weight of the bilayer non-woven pasting mat.

12. The bilayer non-woven pasting mat of claim 1, wherein at least one of the first layer and the second layer further comprise functional fibers.

13. The bilayer non-woven pasting mat of claim 1, wherein the second air permeability is at least 40% lower than the first air permeability.

14. The bilayer non-woven pasting mat of claim 1, wherein the second air permeability is at least 30% lower than the first air permeability.

15. A bilayer non-woven pasting mat for a lead-acid battery, comprising:

a first layer of non-woven web of fibers comprising coarse fibers having an average fiber diameter from about 6 μm to about 25 μm, the first layer of non-woven web of fibers defining a first exterior surface of the bilayer non-woven pasting mat and defining an interior surface that is opposite the first exterior surface;

a second layer of non-woven web of fibers comprising microfibers having an average diameter from about 0.5 μm to about 5 μm, the second layer of non-woven web of fibers defining a second exterior surface of the bilayer non-woven pasting mat and defining an interior surface that is opposite the second exterior surface; and a single binder that simultaneously bonds the coarse fibers in the first layer together, bonds the microfibers in the second layer together, and that bonds the first layer to the second layer, wherein the coarse fibers, the microfibers, the first layer, and the second layer are unbonded prior to application of the single binder;

wherein the coarse fibers of the first layer and the microfibers of the second layer are integrated, intertwined, and intermeshed with one another at an interface or boundary of the first layer and the second layer, thereby providing a gradual transition between the first layer and the second layer;

wherein the first layer of non-woven web of fibers absorbs an active material of an electrode of the lead acid battery;

wherein the second layer of non-woven web of fibers blocks the active material of the electrode from passing through the non-woven pasting mat;

wherein the binder is an acrylic based emulsion;

wherein at least one of the first layer and the second layer further comprise a filler material including at least one of silica and carbon, wherein the filler material comprises between about 0.1 wt. % and 30 wt. % of a total weight of the non-woven pasting mat;

wherein the first layer has a first air permeability and the second layer has a second air permeability, wherein the second air permeability is at least 25% lower than the first air permeability;

wherein the first layer and the second layer are the only fiber layers in the bilayer non-woven pasting mat;

wherein the first exterior surface of the bilayer non-woven pasting mat is configured to directly contact a plate material of the electrode;

wherein the second exterior surface of the bilayer non-woven pasting mat is configured to directly contact a polyethylene film, a rubber film, or an electrolyte of the lead-acid battery;

wherein the first layer of non-woven web of fibers and the second layer of non-woven web of fibers are positioned so that the first layer of non-woven web of fibers directly contacts the second layer of non-woven web of fibers;

wherein the first layer of non-woven web of fibers comprises microfibers having an average diameter from about 0.5 μm to about 5 μm, wherein a weight ratio of the coarse fibers to the microfibers in the first layer ranges between about 70:30 and 99:1; and wherein the second layer of non-woven web of fibers further comprises coarse fibers having an average diameter from about 6 μm to about 25 μm, wherein a weight ratio of the microfibers to the coarse fibers in the second layer ranges between about 30:70 and 99:1.

* * * * *